(12) United States Patent
Hanson et al.

(10) Patent No.: US 9,182,067 B2
(45) Date of Patent: Nov. 10, 2015

(54) EXTRUSION ROLL WITH SELECTABLE SKEW CAPABILITY

(71) Applicant: Processing Technologies International, LLC, Aurora, IL (US)

(72) Inventors: Dana R. Hanson, St. Charles, IL (US); Mitchell L. Gritzner, Montgomery, IL (US)

(73) Assignee: Processing Technologies International, LLC, Aurora, IL (US)

( * ) Notice: Subject to any disclaimer, the term of this patent is extended or adjusted under 35 U.S.C. 154(b) by 567 days.

(21) Appl. No.: 13/713,139

(22) Filed: Dec. 13, 2012

(65) Prior Publication Data

US 2014/0166846 A1    Jun. 19, 2014

(51) Int. Cl.
| | |
|---|---|
| *B29C 43/46* | (2006.01) |
| *F16M 1/00* | (2006.01) |
| *B29C 47/52* | (2006.01) |
| B29C 47/00 | (2006.01) |
| B29C 47/08 | (2006.01) |

(52) U.S. Cl.
CPC ............... *F16M 1/00* (2013.01); *B29C 43/46* (2013.01); *B29C 47/522* (2013.01); *B29C 47/0021* (2013.01); *B29C 47/0864* (2013.01); *B29C 2043/467* (2013.01)

(58) Field of Classification Search
CPC .............. B29C 43/46; B29C 2043/467; B29C 47/0021; B29C 47/004
USPC ................................................. 425/366, 367
See application file for complete search history.

(56) References Cited

U.S. PATENT DOCUMENTS

| | | | | |
|---|---|---|---|---|
| 2,525,744 | A * | 10/1950 | Wilshaw | B29B 7/68 425/182 |
| 3,273,199 | A * | 9/1966 | Kleinewefers | B01D 35/005 100/158 C |
| 4,348,952 | A * | 9/1982 | Gooch | B21B 13/023 100/158 R |
| 5,811,137 | A * | 9/1998 | Clark | A21C 3/02 100/168 |
| 8,152,509 | B2 * | 4/2012 | Hanson | B29C 47/0021 425/172 |
| 8,240,180 | B2 * | 8/2012 | Hanson | B21C 23/06 72/241.6 |

* cited by examiner

*Primary Examiner* — James Mackey
(74) *Attorney, Agent, or Firm* — Wood, Phillips, Katz, Clark & Mortimer

(57) ABSTRACT

A support system through which a first extrusion roll is operatively mounted upon a frame. The first extrusion roll has a shaft that has a first operating axis and axially spaced first and second ends. A first support assembly at the first shaft end has a first housing. A second support assembly acting between the frame and the first support assembly and has a second housing. The second housing is movable relative to the frame to selectively change a relationship between the first extrusion roll and a second extrusion roll on the frame that has a second operating axis and cooperates with the first extrusion roll during formation of a product. The first housing is movable guidingly relative to the second housing along a first path to thereby change an angular relationship between the first and second operating axes.

20 Claims, 8 Drawing Sheets

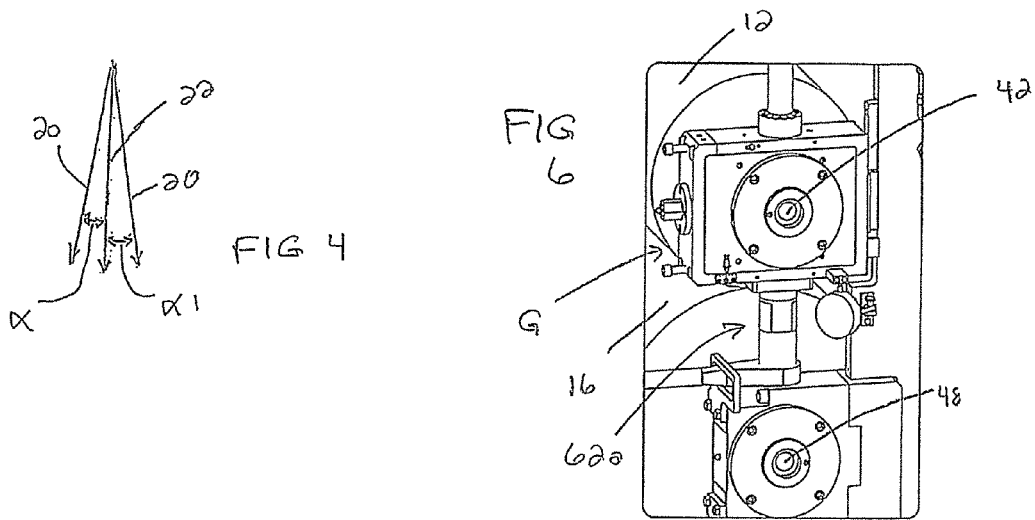
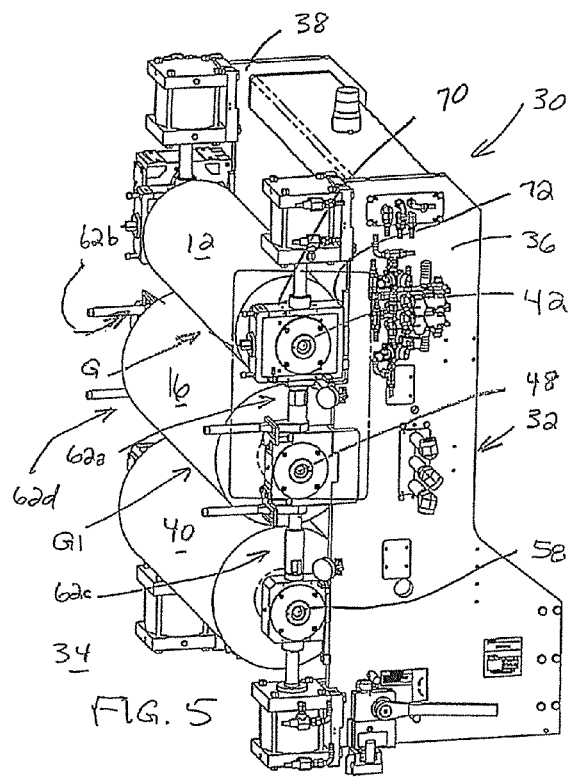

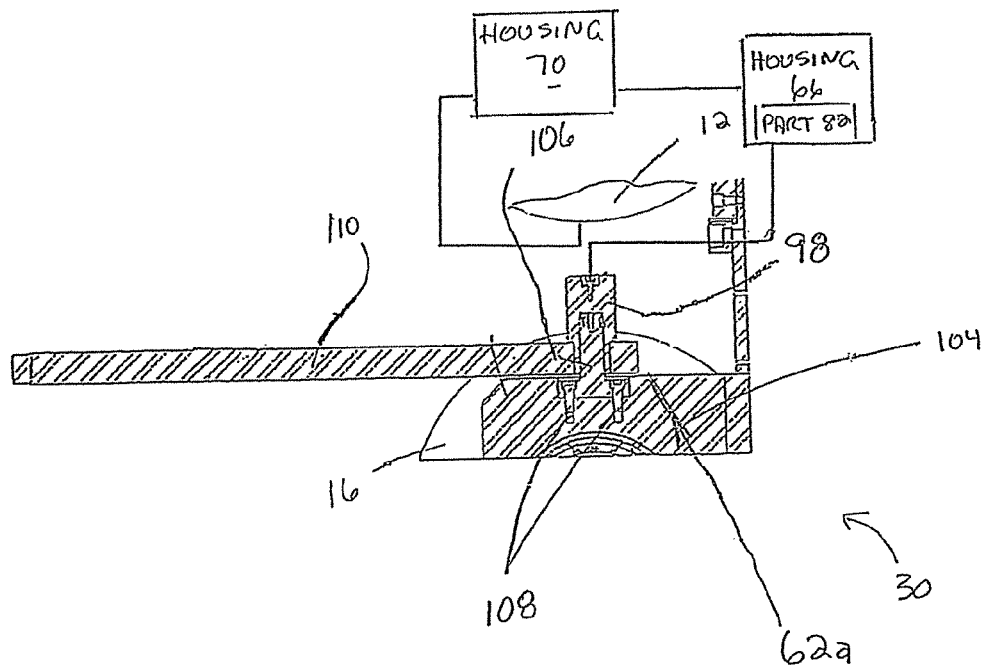
FIG. 7
FIG. 8
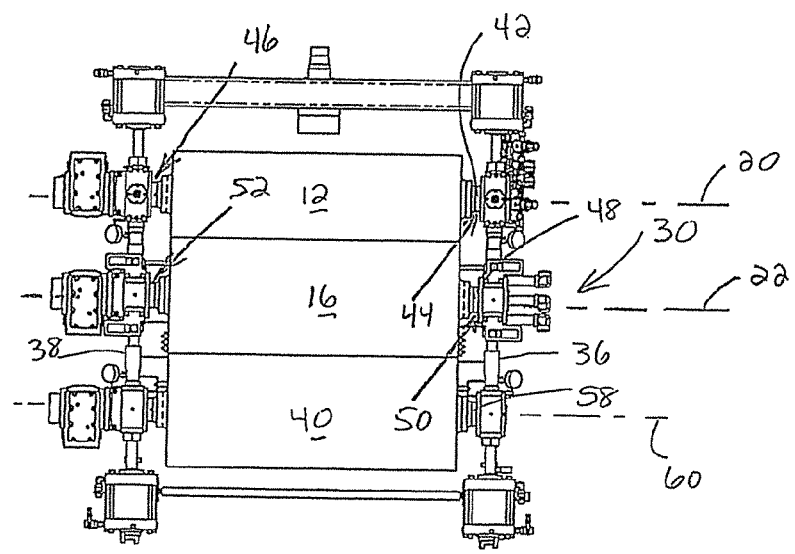

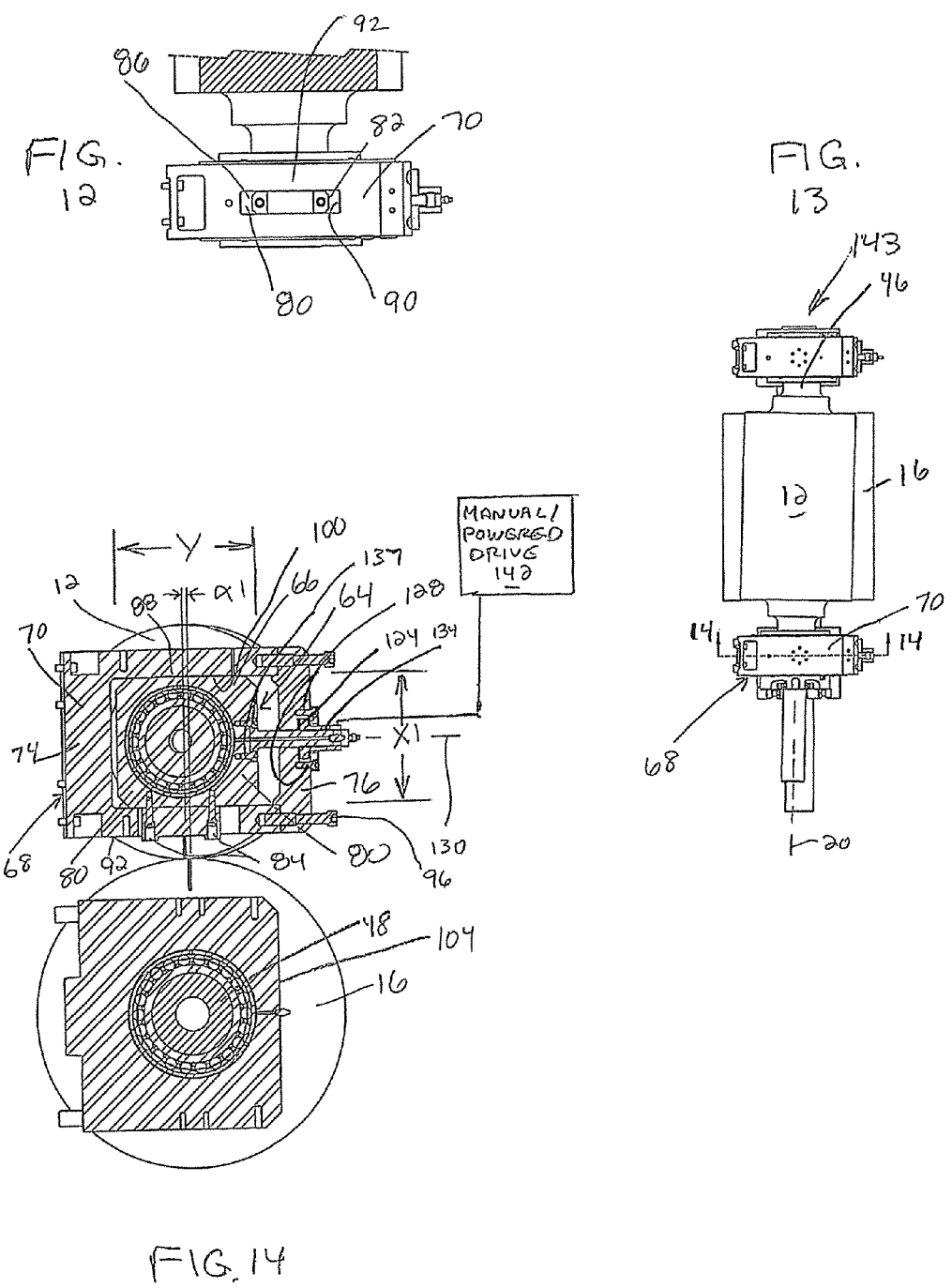

EXTRUSION ROLL WITH SELECTABLE SKEW CAPABILITY

BACKGROUND OF THE INVENTION

1. Field of the Invention

This invention relates to rolls as used in systems to extrusion form products and, more particularly, to a roll that can be selectively skewed relative to a cooperating roll.

2. Background Art

In conventional extrusion forming systems, moldable material is deposited at a nip location between cooperating rolls that are supported at their axial ends upon a frame. By turning the rolls around parallel axes, material is formed to a thickness determined by the gap between the rolls. A problem that is commonly encountered with these systems is the deformation of typically a smaller diameter roll in a cooperating roll pair caused by the thickness of the extruded material during product formation. The material tends to produce a wedging action that causes the unsupported central region of the smaller diameter roll in the cooperating roll pair to deform to a shallow arch shape. It is difficult to maintain a uniform product thickness when this condition occurs. If no accommodation is made for this roll deformation, the quality of the formed product may be compromised.

Further, the arching of the roll tends to produce significant forces upon the ends of a shaft that support the roll upon the frame. In anticipation of this occurring, the shaft and supporting structure may be made with a more robust, and potentially more expensive, construction.

It is also known to skew the deformed roll to place its axis at a slight angle to the axis of the cooperating roll. This causes the arch shape to more closely conform to the cooperating roll, as a result of which there is a more uniform gap dimension over the full axial extent of the rolls, even with the deformation of the one roll maintained.

Heretofore, skew mechanisms have been designed so that the shaft ends on the skewed roll are offset in a manner whereby the supports for the shaft ends on the frame are subjected to potentially large forces. In essence, the parts become misaligned so that as the system is operated, the interacting parts, such as the shaft ends, bearings, and supports, are prone to becoming worn, and may ultimately be prone to failing.

A failure of a part or parts on cooperating components on an extrusion forming line may necessitate shutting the entire line down. This down time can have significant economic consequences, particularly in operations where profit margins are thin.

This industry continues to develop overall system designs that are economically feasible, yet highly reliable in operation, thereby to avoid, or minimize, system downtime. The same design criteria drive the design of skew mechanisms. In spite of designers' striving to meet the above objectives, existing, commercially available systems that allow roll skewing are deficient in one or more respects. The industry continues to seek out improved designs for skew mechanisms on extrusion forming systems.

SUMMARY OF THE INVENTION

In one form, the invention is directed to a support system through which a first extrusion roll is operatively mounted upon a frame. The first extrusion roll includes a shaft that has a first operating axis and axially spaced first and second ends. The support system consists of: a) a first support assembly at the first shaft end and including a first housing; and b) a second support assembly acting between the frame and the first support assembly and including a second housing. The second housing is movable relative to the frame to selectively change a relationship between the first extrusion roll and a second extrusion roll on the frame. The second extrusion roll has a second operating axis and cooperates with the first extrusion roll during formation of a product. The first housing is movable guidingly relative to the second housing along a first path to thereby change an angular relationship between the first and second operating axes.

In one form, the first path is substantially a straight line path.

In one form, the support system is provided in combination with: a) the second extrusion roll that cooperates with the first extrusion roll to define a variable gap therebetween; and b) an actuating assembly through which the first extrusion roll is repositioned relative to the second extrusion roll to vary a dimension of the gap. The actuating assembly has a drive component that acts against the first housing by imparting a force that is transmitted from the first housing to the second housing to thereby vary the dimension of the gap.

In one form, the second housing has an opening through which a part of the first housing is exposed. The drive component acts against the exposed part of the first housing.

In one form, the first housing supports a bearing at the first shaft end.

In one form, the part of the first housing is a discrete projection that extends into the opening in the second housing.

In one form, the second extrusion roll has a shaft that is movable around the second operating axis and has axially spaced first and second ends. The first end of the second extrusion roll is supported on the frame by a third housing. The actuating assembly acts between the third housing and the first housing.

In one form, the support system further includes an actuator assembly for selectively moving the first housing in opposite directions in the first path.

In one form, the actuator assembly is operated one of: a) manually; and b) through a powered drive.

In one form, the actuator assembly acts between the first and second housings.

In one form, the actuator assembly includes a first component that is turned selectively in opposite directions around an axis to thereby move the first housing in opposite directions in the first path.

In one form, there is a bearing that supports the first shaft end. The actuator assembly defines a communication path for a lubricant extending to the bearing.

In one form, the first component is threadably engaged with a second component that extends between, and is connected to, each of the first and second housings.

In one form, the support system has third and fourth support assemblies, respectively the same as the first and second support assemblies, to cooperate with the second shaft end and frame in the same manner that the first and second support assemblies cooperate with the first shaft end and frame.

In one form, the angular relationship between the first and second operating axes is changeable from a first relationship, wherein the first and second operating axes are substantially parallel, into second and third relationships wherein there are opposite skew angles formed between the first and second operating axes.

In one form, the second housing is guided for movement relative to the frame in a second path to vary a spacing between the first and second operating axes at the first shaft end.

In one form, the second path is substantially a straight line path.

In one form, the first housing has a substantially squared shape with oppositely facing surface pairs.

In one form, the first path is substantially a straight line path. One of the surfaces in one of the surface pairs has a first dimension parallel to the first path. A majority of the first dimension of the one of the surfaces bears against the second housing to transmit the force from the first housing to the second housing.

In one form, the invention is directed to a method of changing a relationship between first and second extrusion rolls, as set forth above. The method includes the steps of: providing a support system, as set forth above; imparting a force directly to the first housing; and causing the force imparted to the first housing to be transmitted to the second housing to move the first shaft end and change a spacing between the first and second operating axes at the first end of the first extrusion roll.

BRIEF DESCRIPTION OF THE DRAWINGS

FIG. 4 is a schematic depiction of opposite skew angles for axes of cooperating extrusion rolls;

FIG. 5 is a perspective view of one exemplary component, as shown in FIG. 1, and having incorporated three cooperating extrusion rolls and the inventive support system;

FIG. 6 is an enlarged view of the portion of the component within the rectangular box shown in FIG. 5;

FIG. 7 is a fragmentary, cross-sectional view of an actuating assembly used to vary the spacing between axes of cooperating extrusion rolls on the component in FIGS. 5 and 6;

FIG. 8 is a front elevation view of the component in FIGS. 5-7;

FIG. 12 is an enlarged, fragmentary, bottom view of a part of the inventive support system and showing cooperating support assemblies;

FIG. 13 is a view corresponding to that in FIG. 10 with the upper extrusion roll skewed in one direction;

FIG. 14 is a cross-sectional view of the support system taken along line 14-14 of FIG. 13;

DETAILED DESCRIPTION OF THE PREFERRED EMBODIMENT

Figure 1:
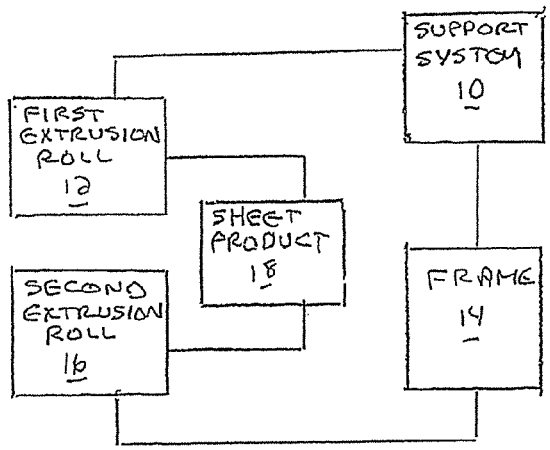
FIG. 1 is a schematic representation of a support system, according to the present invention, incorporated into a system with first and second cooperating extrusion rolls operatively mounted upon a frame.

In FIG. 1, a support system, according to the present invention, is schematically depicted at 10, through which a first extrusion roll 12 is operatively mounted upon a frame 14. The support system 10 is contemplated for use in virtually any system wherein there are at least two rolls, in this case a first extrusion roll 12 and a second extrusion roll 16, that cooperate to allow a sheet product 18 to be formed/advanced therebetween. The components are shown in schematic form in FIG. 1 to encompass virtually a limitless number of different component configurations and arrangements. What is significant with the present invention is the incorporation of two extrusion rolls 12, 16 that cooperate so that as one or more layers are passed therebetween during product formation, there is a tendency of the first extrusion roll 12 to deflect/deform between spaced support locations.

Figure 2:
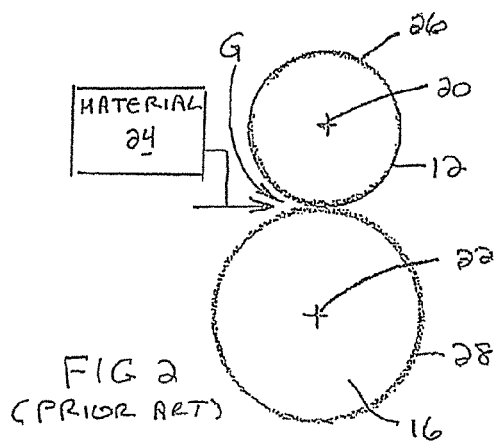
FIG. 2 is a schematic, side elevation view of the first and second extrusion rolls shown in FIG. 1, operatively mounted in a conventional manner, and wherein a material is directed in a gap therebetween to cause deflection of the upper of the two rolls.
Figure 3:
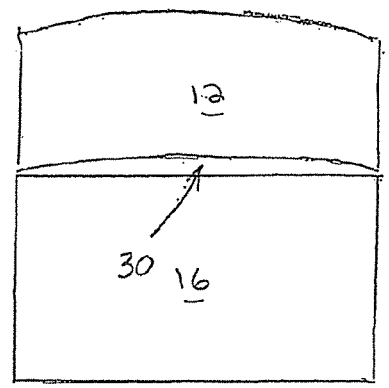
FIG. 3 is a schematic, front elevation view of the rolls in the FIG. 2 state.
Figure 9:
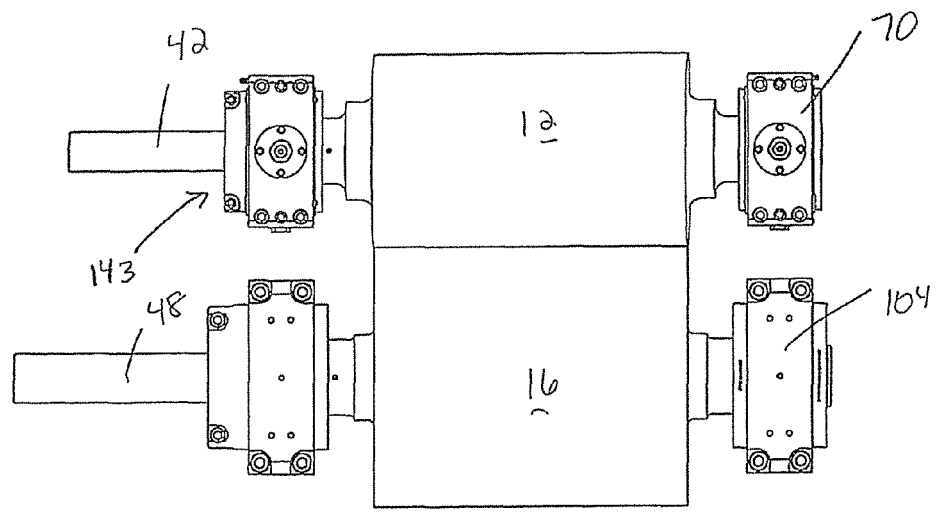
FIG. 9 is an enlarged, front elevation view of first and second extrusion rolls on the component in FIGS. 5-8.

More specifically, the invention is directed to a support system 10 that allows skewing of a first operating axis 20 for the first extrusion roll 12 relative to a second operating axis 22 for the second extrusion roll 16 to accommodate deflection/deformation, as described for conventional systems with respect to FIGS. 2-4.

As depicted in those Figs., material 24, being an extrusion formable starting material, and/or a pre-formed sheet layer, when advanced through a gap G defined between roll surfaces 26, 28, generates forces that cause the surface 26 to be urged radially away from the surface 28 at the unsupported center region at 30 so as to cause an appreciable deflection/deformation of the extrusion roll 12. This causes the first extrusion roll 12 to assume an arch shape, as shown in a somewhat exaggerated manner in FIG. 3. This produces significant stresses and forces on the end supports for the extrusion roll 12 and also causes a mismatching of the roll surfaces 26, 28 that causes the gap G to vary along its axial extent, which may result in a product, advancing downstream from the gap G, having a non-uniform thickness.

It is known to angularly reorient the first extrusion roll 12 to "skew" its axis 20 relative to the axis 22 for the other extrusion roll 16 to accommodate this roll deformation. This skewing allows the arched extrusion roll 12 to wrap conformingly slightly around the surface 28, as opposed to aligning the extrusion rolls 12, 16 over a straight line that is parallel to the axes 20, 22, when there is no roll deformation. This allows the dimension of the gap G to be substantially uniform over its full axial extent with the roll deformation maintained. Skewing is carried out in either upstream or downstream directions, as indicated in FIG. 4 by the angles α, α1, between the axes 20, 22.

One exemplary support system 10 is shown on an exemplary system component, in the form of a roll stand 30 in FIGS. 5-8, that may be used by itself or incorporated into a system to operate in a coordinated manner with other components to form and handle sheet products. The roll stand 30 consists of a frame 32 through which the operating components are supported in operative relationship upon a subjacent surface 34. The frame 32 consists of separate side frame parts 36, 38 which cooperatively support the first extrusion roll 12, the second extrusion roll 16, and a third extrusion roll 40. The first extrusion roll 12 has a shaft 42 with axially spaced ends 44, 46 supported respectively on the frame parts 36, 38. The second extrusion roll 16 has a shaft 48 with axially spaced ends 50, 52 supported respectively on the frame parts 36, 38. The third extrusion roll 40 is similarly operatively mounted.

The shaft 42 defines the first operating axis 20. The shaft 48 defines the second operating axis 22, with the third extrusion roll having a supporting shaft 58 with a third operating axis 60.

In this embodiment, the first extrusion roll 12 has a smaller diameter than each of the extrusion rolls 16, 40. The second extrusion roll 16 is operatively mounted to the frame 30 so that its axis 22 is at all times angularly fixed relative to the frame 30.

On the other hand, the extrusion roll 12 is movable vertically relative to the extrusion roll 16 to vary a dimension of the gap G therebetween. Similarly, the extrusion roll 40 is movable vertically relative to the extrusion roll 16, to vary the dimension of a gap G1 therebetween.

The basic components on the roll stand 30 are generally the same as those shown in U.S. Pat. No. 8,152,509, the disclosure of which is incorporated herein by reference. U.S. Pat. No. 8,152,509 also discloses details of paired actuating assemblies 62a, 62b and 62c, 62d that are used to move the extrusion rolls 12, 40 relative to the extrusion roll 16, to respectively vary the dimensions of the gaps G, G1.

The support system 10 has similar components incorporated at each axial end of the roll 12, and thus only the exemplary structure at the shaft end 44 will be described, with it understood that the components at the opposite shaft end 46 have the same construction and operate in the same manner.

The support system 10, as shown additionally in FIGS. 9-19, consists of a first support assembly 64 with a first housing 66 and a second support assembly 68 with a second housing 70. The second support assembly 68 acts between the frame 14 and the first support assembly 64.

More specifically, the housing 70 is guided vertically relative to the frame part 36 along an elongate rail 72. The rail 72 defines a vertical, linear path for the housing 70. By moving the housing 70 vertically upwardly, the spacing between the axes 20, 22 is increased, thereby increasing the dimension of the gap G. As noted above, the components at opposite ends of the extrusion roll 12 operate similarly and simultaneously through actuating assemblies 62a, 62b so that the axis 20 does not skew vertically relative to the axis 22 as the extrusion roll 12 is raised and lowered.

The housing 70 is made with separate parts 74, 76 which allow operative placement of the housing 64 within a cavity 78 bounded by the U-shaped housing part 74. The cavity 78 is generally squared with a longer, horizontal dimension X and a shorter, vertical dimension X1.

The housing 66 has a generally complementary shape with a horizontal dimension Y that is less than the dimension X and a vertical dimension Y1 approximately equal to the dimension X1.

The housing 66 also has a two-part construction, with a main part 80 having the transverse dimensions Y, Y1. A separate part 82 is secured by fasteners 84 to one surface 86 on the housing 66 that is one of two surfaces 86, 88 making up an oppositely facing surface pair with the horizontal dimension Y. The part 82 projects into an opening 90 through a bottom wall 92 of the housing 70. The housing 66 supports a bearing 94 at the shaft end 44.

Figure 10:
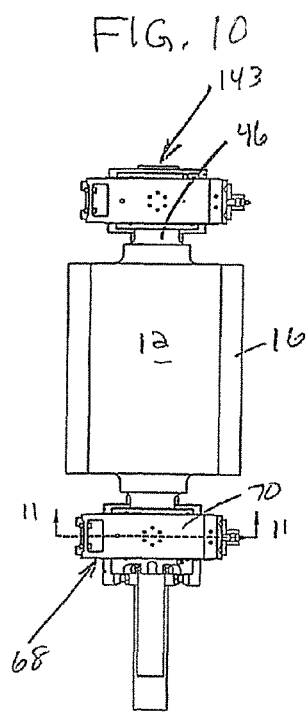
FIG. 10 is a plan view of the components shown in FIG. 9 and with there being no skew of the upper extrusion roll.
Figure 11:
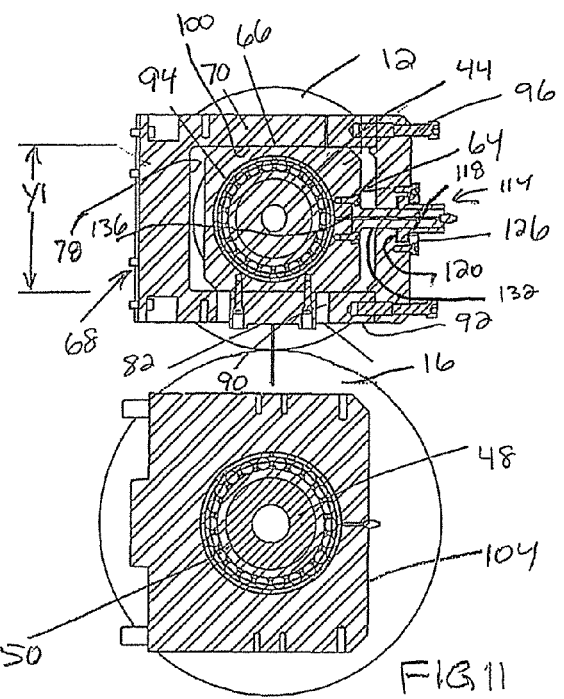
FIG. 11 is a cross-sectional view of the support system taken along line 11-11 of FIG. 10.
Figure 16:
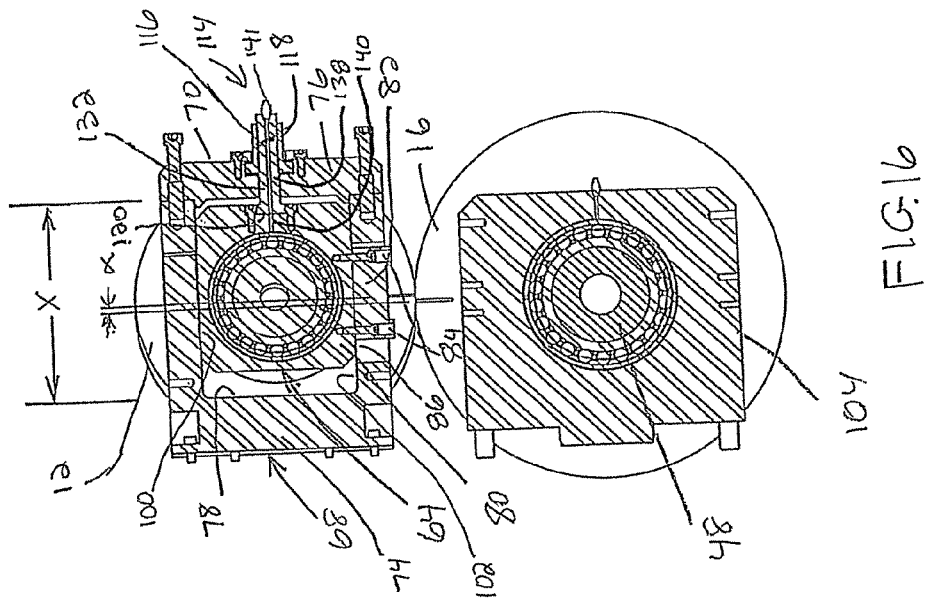
FIG. 16 is a cross-sectional view of the support system taken along line 16-16 of FIG. 15.
Figure 17:
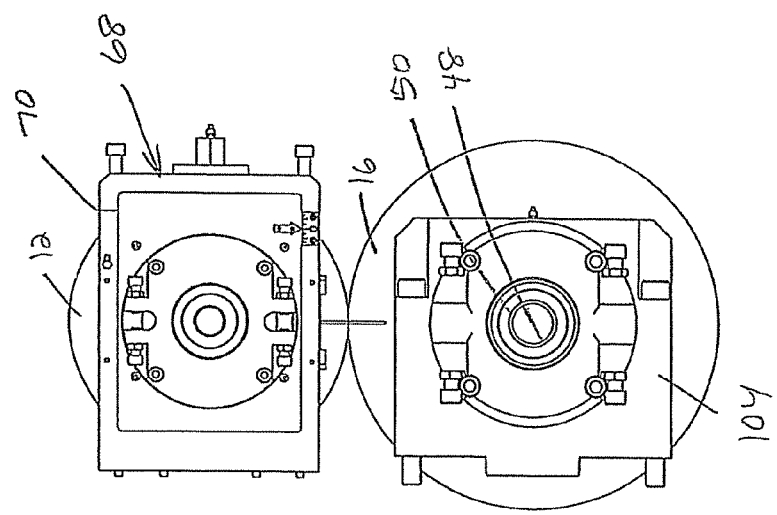
FIG. 17 is an enlarged, side elevation view of the cooperating extrusion rolls as shown in the FIG. 10 state.
Figure 15:
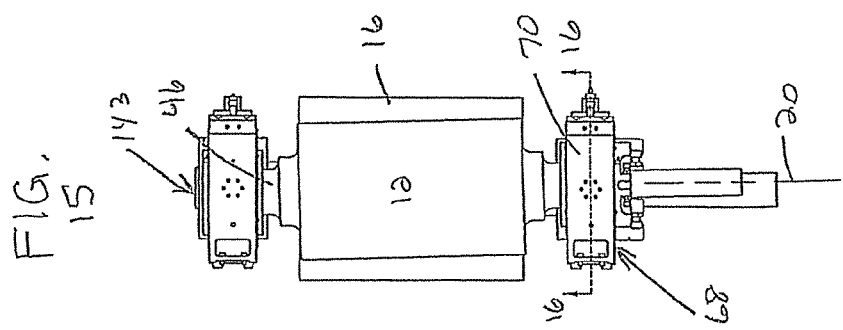
FIG. 15 is a view corresponding to that in FIGS. 10 and 13 and with the upper extrusion roll skewed in a direction opposite to that shown in FIG. 13.
Figure 18:
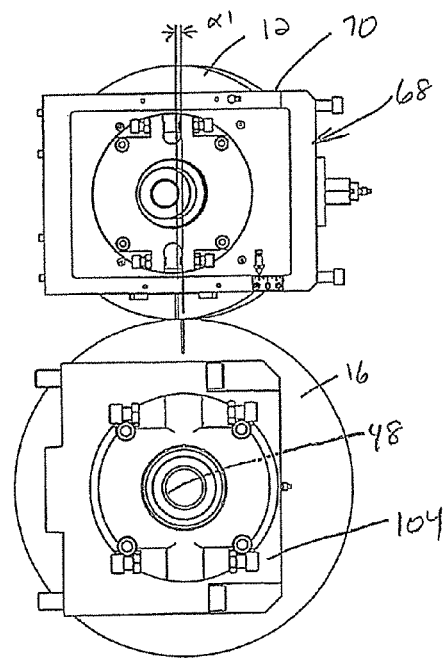
FIG. 18 is a view as in FIG. 17 and showing the extrusion rolls in the FIG. 13 state.
Figure 19:
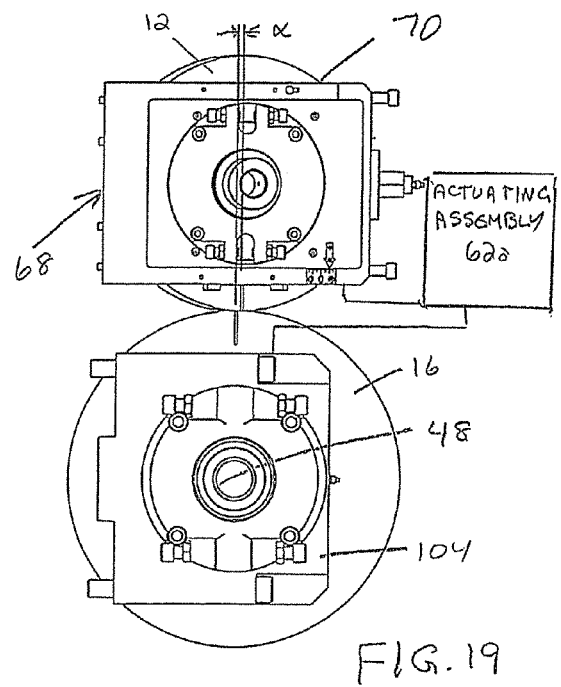
FIG. 19 is a view as in FIG. 17 and showing the extrusion rolls in the FIG. 15 state.

The above configuration and arrangement of components allows the housing 66 and the supported shaft end 44 to be translated in a linear horizontal path relative to the housing 70 and frame 14 between a first position, shown in FIGS. 10, 11 and 17, wherein the axes 20, 22 have a horizontally parallel relationship, to positions shown in FIGS. 13, 14 and 18 and FIGS. 15, 16, and 19, wherein the axis 20 is skewed at angles α, α1 with respect to the axis 22 in opposite directions.

The housings 66, 70 and cavity 78 are dimensioned so that the housing 66 can translate within the cavity 78 along its linear travel path a distance adequate to allow the full desired range of skew angles to be set.

The opening 90 in the housing 70 is dimensioned in the line of the travel path for the first housing 66 to be greater than the corresponding dimension for the housing part 82 to permit the same range of movement.

By constructing each of the housings 66, 70 with multiple parts, the main part 80 of the housing 66 can be advanced into the cavity 78 that is exposed with the part 76 of the housing 70 separated. Once the housing part 80 is fully within the cavity 78, the housing part 82 can be put in place through the opening 90 and secured using appropriate fasteners 84. The housing part 76 can thereafter be put in place on the housing part 74 and secured using like fasteners 96. All of the fasteners 84, 96 may be conventional threaded fasteners.

The actuating assemblies 62a, 62b are of substantially the same construction, as shown in U.S. Pat. No. 8,152,509. The exemplary actuating assembly 62a, shown in detail in FIG. 7, has a drive component 98 that acts directly against the housing 66, and specifically the part 82 thereon exposed at the opening 90, as opposed to acting directly against the housing 70. This construction is preferred so that the driving force is imparted through the housing 66 to the upper region of the housing 70, thereby making it less prone to being distorted under the applied force. More specifically, the housing surface 88 bears upon a downwardly facing surface 100 that is one of two surfaces 100, 102 of an oppositely facing surface pair on the housing 70 that bounds the cavity 78. The force exerted by the housing 66 is applied to the surface 100 over a majority, and substantially the entirety, of the horizontal dimension Y of the housing 66.

As with the construction described in U.S. Pat. No. 8,152,509, the end 50 of the shaft 48 on the second extrusion roll 16 is supported on the frame 32 by a third housing 104. The actuating assembly 62a, while not shown in FIGS. 11, 14 and 16-18, acts between the first and third housings 66, 104, respectively.

The actuating assembly 62a, as shown in FIG. 7, consists of a threaded base 106 secured to the third housing 104 using fasteners 108. The drive component 98 is threaded to the base 106 and is turned by pivoting a ratcheted handle 110.

Figure 20:
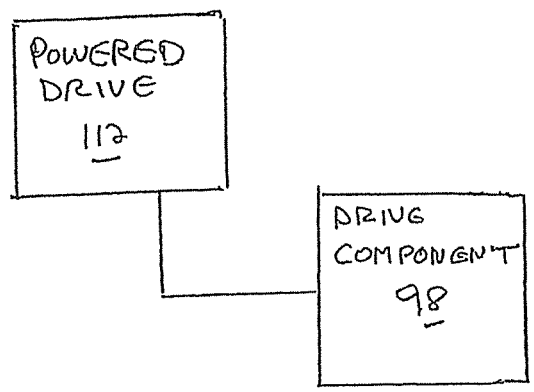
FIG. 20 is a schematic representation of a power drive for operating the actuating assembly in FIG. 7.

Alternatively, as shown in FIG. 20, the drive component 98 may be operated by a powered drive 112.

The support system 10 has an actuator assembly at 114 that moves the housing 66 selectively in opposite direction in its guided path. The actuator assembly 114 acts between the first and second housings 66, 70.

The actuator assembly 114 consists of a first component 116 with internal threads 118 and an enlarged base 120 that is blocked in an undercut seat 124 on the housing part 76. A plate 126 blocks the base 120 in the seat 124 and is fixed by fasteners 128. With this arrangement, the first component 116 is captively held against the housing part 76 but allowed to turn around an axis 130 without shifting in an axial direction relative to the housing part 76.

The first component 116 cooperates with a second component 132 that extends between, and is connected to, each of the housings 66, 70. More specifically, the second component 132 is elongate with external threads 134 engaged with the internal threads 118 on the first component 116. The second component 132 has an enlarged head 136 that is fixed to the housing part 80 by threaded fasteners 137 to project in cantilever fashion therefrom. The projecting portion of the second component 132 is directed through the housing part 76 and into threaded engagement with the first component 116.

By turning the first component 116 around the axis 130, the housing 66 is caused to be translated in its travel path in opposite directions, dictated by the direction of turning of the first component 116.

The second component has a through passage 138 that communicates with a short passage 140 in the housing part 80 to the bearing 94. This arrangement defines a communication path for a lubricant extending from externally of the actuator assembly 114 to the bearing 94. A conventional fitting 141 is used to introduce lubricant, as needed.

The first component 116 can be turned through a manual or powered drive, as indicated schematically at 142 in FIG. 14.

As noted above, the opposite end 46 of the first extrusion roll 12 can be controlled using third and fourth support assemblies, shown generally at 143 in FIGS. 9, 10, 13, and 15, corresponding to the first and second support assemblies 64, 68, but on the opposite frame side at the frame part 38.

Figure 21:
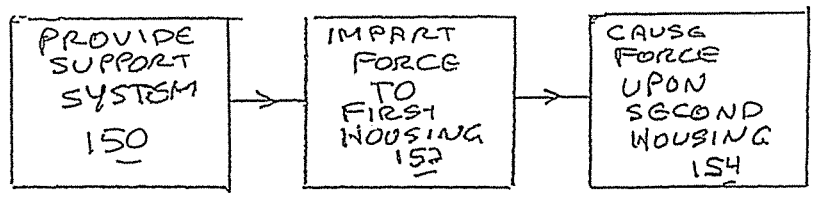
FIG. 21 is a flow diagram representation of a method for changing a relationship between extrusion rolls, according to the invention.

With the structures described above, the invention contemplates performing a method of changing a relationship between first and second extrusion rolls, as set forth above. The method includes the steps of providing a support system, as described above, and shown at block 150 in FIG. 21. As shown at block 152, a force is imparted directly to the first housing. As shown at block 154, the force imparted to the first housing is caused to be transmitted to the second housing to thereby change a spacing between the first and second operating axes at the first end of the first extrusion roll.

The support assemblies 64, 68 can be operated simultaneously at opposite ends of each of the associated shafts to control skew. It is possible to skew an extrusion roll by operating the support assemblies at only one axial end. Alternatively, both axial ends are angularly reoriented to effect the skewing.

The foregoing disclosure of specific embodiments is intended to be illustrative of the broad concepts comprehended by the invention.

The invention claimed is:

1. A support system through which a first extrusion roll is operatively mounted upon a frame, the first extrusion roll comprising a shaft that has a first operating axis and axially spaced first and second ends, the support system comprising:
    a first support assembly at the first shaft end and comprising a first housing; and
    a second support assembly acting between the frame and the first support assembly and comprising a second housing,
    the second housing movable relative to the frame to selectively change a relationship between the first extrusion roll and a second extrusion roll on the frame, the second extrusion roll having a second operating axis and cooperating with the first extrusion roll during formation of a product,
    the first housing movable guidingly relative to the second housing along a first path to thereby change an angular relationship between the first and second operating axes.

2. The support system according to claim 1 wherein the first path is substantially a straight line path.

3. The support system according to claim 1 in combination with the second extrusion roll that cooperates with the first extrusion roll to define a variable gap therebetween and an actuating assembly through which the first extrusion roll is repositioned relative to the second extrusion roll to vary a dimension of the gap, the actuating assembly comprising a drive component that acts against the first housing by imparting a force that is transmitted from the first housing to the second housing to thereby vary the dimension of the gap.

4. The support system according to claim 3 wherein the second housing has an opening through which a part of the first housing is exposed and the drive component acts against the part of the first housing.

5. The support system according to claim 1 wherein the first housing supports a bearing at the first shaft end.

6. The support system according to claim 4 wherein the part of the first housing is a discrete projection that extends into the opening in the second housing.

7. The support system according to claim 3 wherein the second extrusion roll comprises a shaft that is movable around the second operating axis and has axially spaced first and second ends, the first end of the second extrusion roll supported on the frame by a third housing and the actuating assembly acts between the third housing and the first housing.

8. The support system according to claim 1 wherein the support system further comprises an actuator assembly for selectively moving the first housing in opposite directions in the first path.

9. The support system according to claim 8 wherein the actuator assembly is operated one of: a) manually; and b) through a powered drive.

10. The support system according to claim 8 wherein the actuator assembly acts between the first and second housings.

11. The support system according to claim 10 wherein the actuator assembly comprises a first component that is turned selectively in opposite directions around an axis to thereby move the first housing in opposite directions in the first path.

12. The support system according to claim 11 wherein there is a bearing that supports the first shaft end and the actuator assembly defines a communication path for a lubricant extending to the bearing.

13. The support system according to claim 11 wherein the first component is threadably engaged with a second component that extends between, and is connected to, each of the first and second housings.

14. The support system according to claim 1 wherein the support system comprises third and fourth support assemblies, respectively the same as the first and second support assemblies, to cooperate with the second shaft end and frame in the same manner that the first and second support assemblies cooperate with the first shaft end and frame.

15. The support system according to claim 1 wherein the angular relationship between the first and second operating axes is changeable from a first relationship wherein the first and second operating axes are substantially parallel into second and third relationships wherein there are opposite skew angles formed between the first and second operating axes.

16. The support system according to claim 1 wherein the second housing is guided for movement relative to the frame in a second path to thereby vary a spacing between the first and second operating axes at the first shaft end.

17. The support system according to claim 16 wherein the second path is substantially a straight line path.

18. The support system according to claim 3 wherein the first housing has a substantially squared shape with oppositely facing surface pairs.

19. The support system according to claim 18 wherein the first path is substantially a straight line path, one of the surfaces in one of the surface pairs has a first dimension parallel to the first path and a majority of the first dimension of the one of the surfaces bears against the second housing to transmit the force from the first housing to the second housing.

20. A method of changing a relationship between first and second extrusion rolls as set forth in claim 1, the method comprising the steps of:
   providing a support system as set forth in claim 1;
   imparting a force directly to the first housing; and
   causing the force imparted to the first housing to be transmitted to the second housing to thereby move the first shaft end and thereby change a spacing between the first and second operating axes at the first end of the first extrusion roll.

\* \* \* \* \*